United States Patent [19]

Edele et al.

[11] Patent Number: 5,634,726

[45] Date of Patent: Jun. 3, 1997

[54] METHOD OF FIXATING A SHAFT IN ITS BEARING CASING IN WIPER INSTALLATIONS, AS WELL AS WIPER INSTALLATION, IN PARTICULAR FOR CLEANING THE WINDSCREEN OF AN AUTOMOTIVE VEHICLE

[75] Inventors: Reinhard Edele; Oldrich Krizek, both of Bietigheim-Bissingen, Germany

[73] Assignee: ITT Automotive Europe GmbH, Germany

[21] Appl. No.: 367,347

[22] PCT Filed: Aug. 26, 1993

[86] PCT No.: PCT/EP93/02300

§ 371 Date: Mar. 3, 1995

§ 102(e) Date: Mar. 3, 1995

[87] PCT Pub. No.: WO94/05533

PCT Pub. Date: Mar. 17, 1994

[30] Foreign Application Priority Data

Sep. 4, 1992 [DE] Germany ................ 42 29 495.9

[51] Int. Cl.$^6$ ................ F16C 33/02; B60S 1/34; B29C 39/00
[52] U.S. Cl. ................ 384/276; 15/250.3; 15/250.31; 29/898.049; 264/242; 384/295; 384/138; 384/416
[58] Field of Search ................ 384/276, 280, 384/283, 295, 296, 297, 299, 300, 428, 125, 138, 416; 29/898, 898.042, 898.047, 898.049, 898.05, 898.054, 898.055, 898.059, 898.12, 527.3, 527.4; 164/98; 264/242; 15/250.3, 250.31, 250.34

[56] References Cited

U.S. PATENT DOCUMENTS

| 1,720,139 | 7/1929 | Niven | 29/898.049 X |
| 2,815,253 | 12/1957 | Spriggs | 384/299 |
| 2,878,506 | 3/1959 | Krohm | 15/250.31 X |
| 2,970,869 | 2/1961 | Thomas | 384/416 |
| 2,981,573 | 4/1961 | Reuter | 384/138 |
| 3,094,376 | 6/1963 | Thomas | 384/297 X |
| 3,498,363 | 3/1970 | Spindler | 29/898.12 X |
| 3,764,647 | 10/1973 | McDow | 264/242 |
| 3,846,000 | 11/1974 | Kohler | 384/280 |
| 4,290,181 | 9/1981 | Jackson | 29/898.049 X |
| 4,660,996 | 4/1987 | Marshall | 384/125 X |

FOREIGN PATENT DOCUMENTS

| 2010922 | 9/1971 | Germany. |
| 3637462 | 5/1988 | Germany. |
| 4028892 | 3/1992 | Germany. |
| 2088707 | 6/1982 | United Kingdom. |
| 2213709 | 8/1989 | United Kingdom | 15/250.34 |
| 2248669 | 4/1992 | United Kingdom. |

Primary Examiner—Thomas R. Hannon
Attorney, Agent, or Firm—Thomas N. Twomey; J. Gordon Lewis

[57] ABSTRACT

A system for fixating a shaft in its bearing casing as well as in a wiper installation the shaft is fixated in its bearing in that the annular gap between the shaft and the bearing is filled by the injection of a plastic material rendering optimum sealing and load bearing qualities.

2 Claims, 2 Drawing Sheets

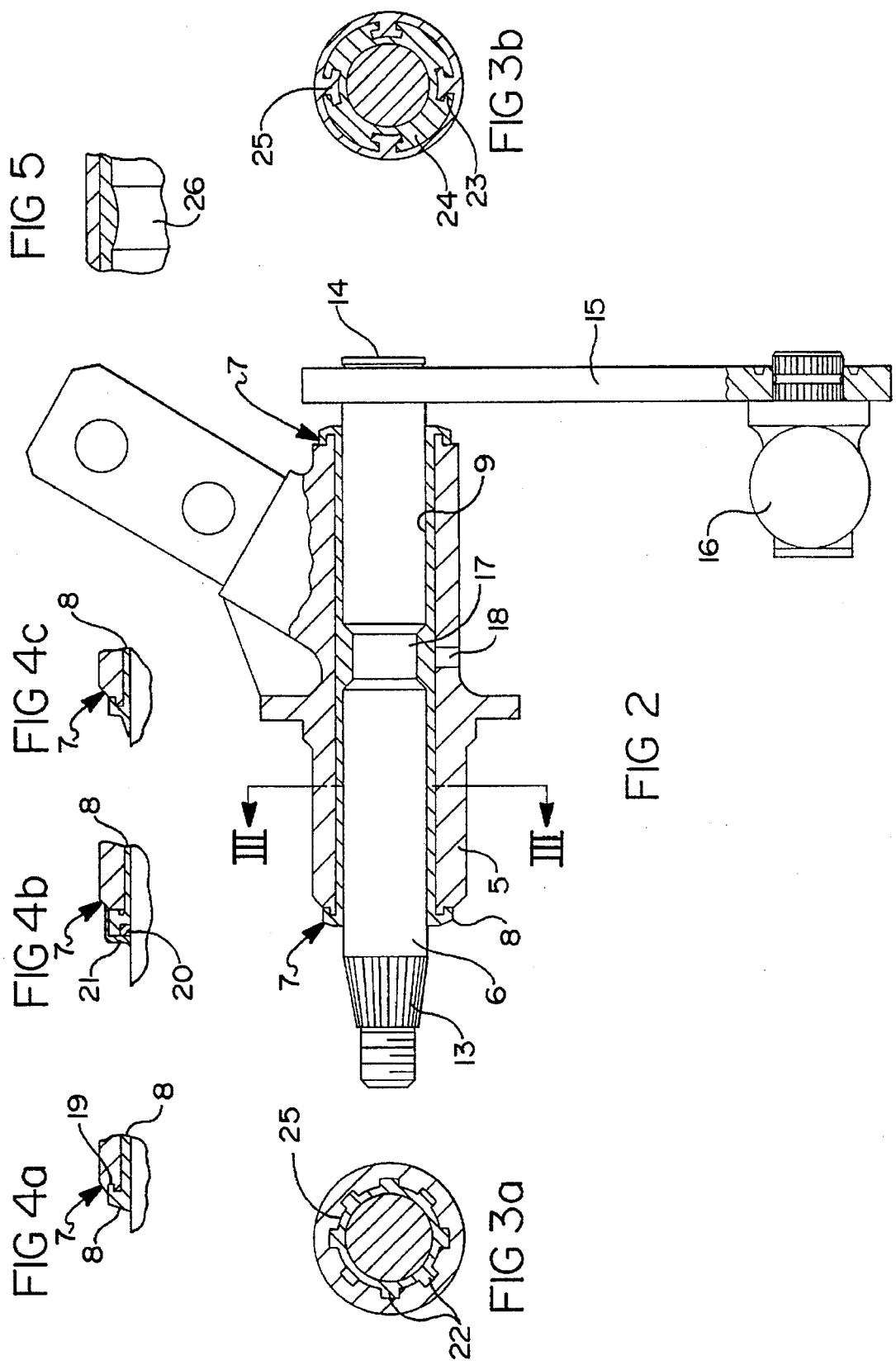

METHOD OF FIXATING A SHAFT IN ITS BEARING CASING IN WIPER INSTALLATIONS, AS WELL AS WIPER INSTALLATION, IN PARTICULAR FOR CLEANING THE WINDSCREEN OF AN AUTOMOTIVE VEHICLE

TECHNICAL FIELD

This invention relates to a system of fixating a shaft in its bearing casing and more particularly relates to a system of fixing a shaft in its bearing casing wherein an annular gap is provided between the shaft and the bearing casing.

BACKGROUND OF THE INVENTION

From German Patent Application (DE) No. 40 28 892 A1 a drive mechanism has become known which in particular is used for windscreen wipers of automotive vehicles and which has a shaft projecting out of one front side of a bearing casing, with a cylindrical slide bearing being mounted to the bearing casing with a small spacing in respect of the latter's front side. Because of the slide bearing, an annular gap is confined between the bearing casing and the shaft. A bushing made of elastic plastic is provided for sealing the annular gap with regard to its surroundings. This bushing is fixed on the bearing casing and shuts the annular gap off from the slide bearing. On its end averted from the bearing casing, the bushing is provided with a radially inward projecting sealing flange engaging an annular groove of the shaft. Such a shaft bearing has the advantage of being extremely sturdy. However, the design and assembly of the shaft bearing is complicated and expensive and, as a rule, several components will be required to render the best support and sealing possible.

It is thus an object of this invention to provide a system for allowing the shaft to be easily supported in the bearing casing.

Regarding the method referred to at the beginning, this object is solved according to this invention in that, after insertion and alignment of the shaft in its bearing casing, the annular gap is at least sectionally filled by the injection of plastified plastic material or metal.

The present invention includes embodiments where the annular gap is filled by the injection of plastic material. However, it can also be filled by the injection of a copper, lead and/or tin alloy. Thus, in the inventive method, neither slide or roller bearings are inserted between the shaft and the bearing casing. All that is done there is to fill the annular space by injecting plastic material. After curing of the plastic material the same serves both as a bearing of the shaft and as a seal against the penetration of dirt and humidity from the surroundings into the bearing and/or against leakage of lubricant out of the bearing. This renders the advantage of not having to insert any additional components other than the plastic material into the annular gap in order to support and seal the shaft. Further, manufacture of such a type of shaft fixation is easily and quickly implemented. Admittedly, as a rule, the shaft is aligned, i.e. centered, after its insertion into the bearing casing. This operation, however, is not necessary by all means. Due to the injected plastic material it is also possible to fixate the shaft in offset or tilted positions in the bearing casing. A further advantage of the injection of plastic material into the annular gap is that the internal shape of the bearing casing may also feature a conical design. This is of special advantage in case of cast casings.

Further, there is no need for aftertreating the internal shape after the manufacture of the bearing casing, in particular so with regard to widening it to predetermined dimensions. In particular, no mechanical aftertreatment is required in case of bearing casings made from aluminum die-castings despite the considerable dimensional tolerances caused by the cooling of the bearing casings.

In order to maintain a defined play between the shaft and the cured plastic material the shaft is heated before filling the annular gap by injection, in particular up to a temperature of 200° C.±30° C. As, after the injection, curing of the plastic material will take place at a faster rate than cooling of the shaft, a defined play will be generated by the amount of shrinkage of the shaft, thereby an easy-motion rotatability of the shaft is guaranteed.

The plastic material is advantageously injected axially and/or radially into the annular gap. Depending on the shape and accessibility of the annular gap as well as on the gap length and on the temperature of the materials confining the annular gap as well as on the plastic material used the same is injected into the annular gap either radially so that it is pressed to both sides or injection will be axial. Axial injection will be of particular advantage if the bearing casing is not readily accessible from the outside.

In a further embodiment it is provided to inject different plastic materials into the annular gap at the same time or one after the other. In doing so, it is possible to use suitable materials, for instance, with regard to a low friction coefficient, a good sealing action, a high-degree resistance against certain substances such as greases, oils, water or aggressive agents. By way of suitable feed openings, these materials may be injected into the annular gap in succession or simultaneously. In this way, it is possible to combine the properties of the different plastic materials.

In order to prevent the plastic material injected into the annular gap from emerging from the same, the annular gap will be closed axially during the injection, for instance, by means of a tool. This tool advantageously allows the material emerging from the annular gap to be diverted so that this material at least partially is injection-moulded around the axial end of the bearing casing. This will anchor the plastic material on the bearing casing and prevent axial slip.

Fixation of the plastic material in the circumferential direction on the bearing casing is achieved in that the plastic material is injected into recesses provided on the inside of the bearing casing. These recesses can also have undercuts and, in particular, are designed like dovetails. Axial fixation of the shaft is achieved in that the plastic material is injected into recesses provided on the circumferential surface of the shaft. These recesses may be cylindrical or spherical grooves. Other shapes are possible as long as, in the circumferential direction, they are symmetrical with respect to rotation.

According to this invention, the above-defined object is solved in a wiper installation of the type referred to in that the annular gap between the shaft and its casing is at least sectionally filled by the injection of a plastic material or metal.

Thereby, the abovementioned advantages will be achieved. In the following reference will be made to the plastic material injection, with the injection of metal being applicable with the same advantages.

It is possible to reduce the friction between the shaft and the plastic material advantageously in that the plastic material contains the addition of a lubricant. Such additions may be metallic or liquid additions.

With preference, the plastic material is the thermoplastic or duroplastic type. With a thermoplastic material being used, the same will be plastified upon heating and will be injected into the annular gap. Auxiliary tools will fixate the wiper shaft in respect of the bearing casing until the injected thermoplastic material will have cooled and cured. When using duroplastic material the same will be activated, for instance, by means of the addition of a hardener and will be injected in plastic condition into the annular gap. The duroplastic material will set in particular by means of the application of heat and will fixate the shaft. Heat may be applied to the duroplastic material by a heated shaft, for instance.

When cured, the injected plastic material will advantageously provide a bearing and sealing of the shaft. As already mentioned, no further components will be required for the bearing and sealing functions.

With preference, the shaft or the inside of the bearing casing are provided with steps, recesses, shoulders or the like filled by the injection of plastic material. These changes in the shape of the shaft and/or of the inside of the bearing casing provide anchoring points for the plastic material so that, on the one hand, the same is firmly connected to the bearing casing and, on the other hand, the shaft is axially held rigidly by the plastic material.

Axial anchoring of the plastic material within the bearing casing will further be achieved in that the plastic material rises axially and, in particular, radially above the bearing casing. Using a suitable tool, it is further possible to press the plastic material in the area where it axially rises above the bearing casing onto the shaft surface during the curing process. This will render a particularly good sealing effect. At its axial ends, the plastic material on the shaft will taper.

Another way of achieving an optimum sealing action may be that within the plastic material additional seals such as O-rings or the like are integrated. In this case, it is possible to use as plastic material, for instance, a material designed for an optimum sliding friction coefficient, an optimum sealing action being achieved for instance by the O-ring injected, i.e., integrated into the plastic material. In this way it is possible to combine the properties of the O-ring with those of the plastic material.

A further sealing type as well as a better type of anchoring of the plastic material will be achieved in that the bearing casing has a circumferential axial groove provided on its axial ends. The plastic material can be injected into this circumferential axial groove or, as long as the axially emerging plastic material is still plastically ductile, it can be pressed into the circumferential axial groove.

In some embodiments, the shaft is provided to be the driven shaft of a wiper motor. In another embodiment the shaft is that of a wiper bearing. In the first-mentioned embodiments, the bearing casing is the casing of the wiper motor or rather of its gear and in the second-mentioned embodiment of the wiper bearing the bearing casing is formed by the bearing bush receiving the shaft.

BRIEF DESCRIPTION OF THE DRAWINGS

FIG. 2 is a side view of a wiper bearing with a longitudinal section of the bearing bush.

FIGS. 3a and 3b are sections III—III as per FIG. 2.

FIGS. 4a–c are embodiments of the axial front surface of the bearing bush.

FIG. 5 is a further embodiment of a groove of the wiper shaft.

DETAILED DESCRIPTION OF THE PREFERRED EMBODIMENT

Figure 1:
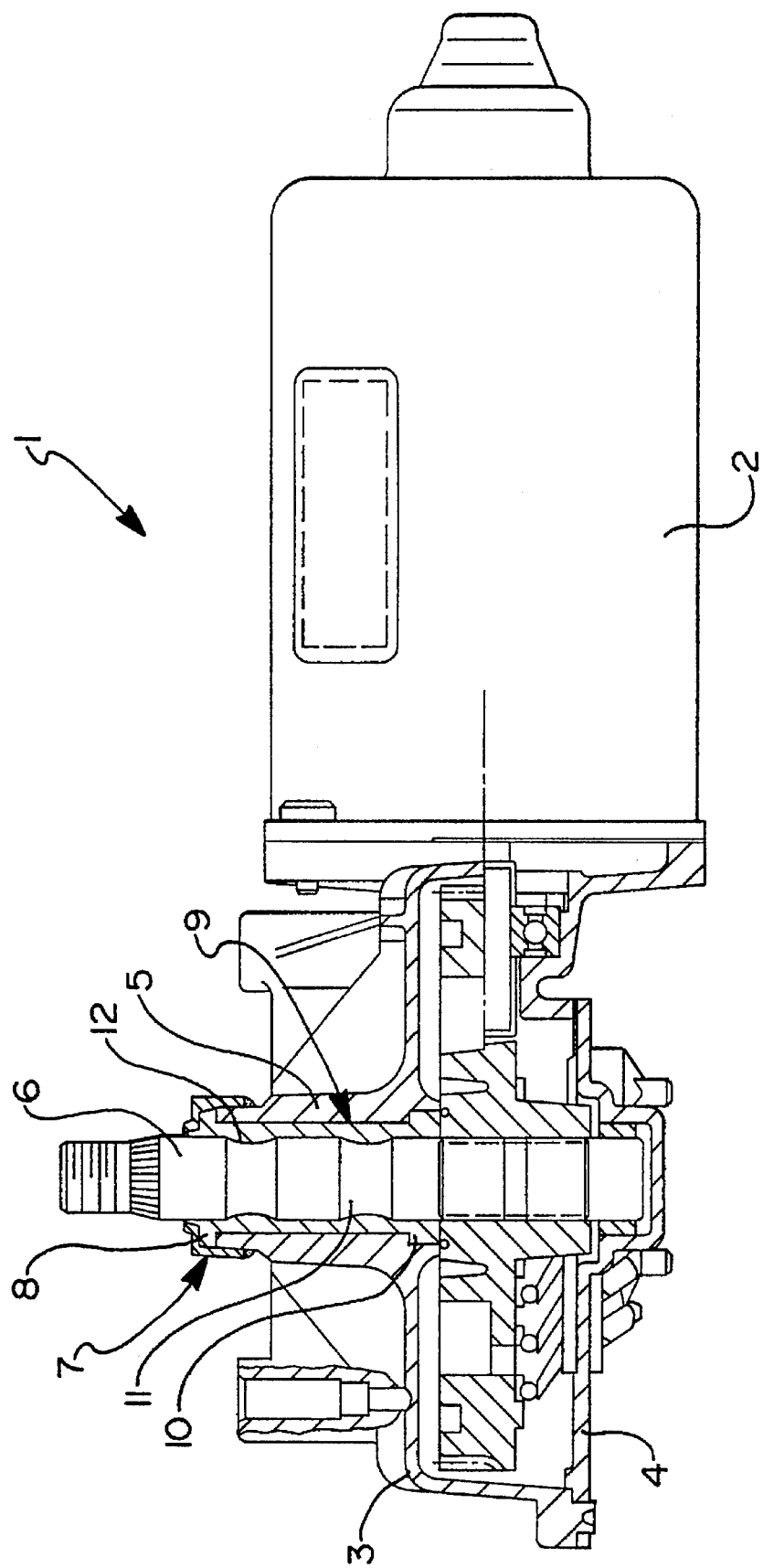
FIG. 1 is a side view of a wiper motor with a longitudinal section of the gear.

In FIG. 1, a drive mechanism is represented the whole of which is referred to by numeral 1. It comprises a motor casing 2 which essentially accommodates the stationary and rotating electric components of an electric motor (not shown). Flanged to the motor casing 2 is a cup-shaped gear casing 3 locked by a cover 4. On the side of the gear casing 3 which is opposite cover 4, the gear casing 3 is designed as bearing casing 5 wherein a wiper shaft 6 is supported to rotate. The wiper shaft 6 which protrudes from a front side 7 of the bearing casing 5, which front side 7 is averted from the gear casing 3, is driven in a rotating or swinging manner by the electric motor by way of gear members accommodated in the gear casing 3.

For supporting the wiper shaft 6 in the bearing casing 5 a plastic material 8 is injected into an annular gap 9 between the wiper shaft 6 and the bearing casing 5. This plastic material 8 fills the annular gap 9 over the entire length of the bearing casing 5 and penetrates into recesses 10 of the bearing casing 5 as well as into recesses 11 and 12 of the wiper shaft 6. The recess 10 is designed as radial groove in the inside of the bearing casing 5, recesses 11 and 12 being spherical grooves in the wiper shaft 6. Moreover, the plastic material 8 axially and radially overlaps the front side 7 of the bearing casing 5 and is drawn over a certain distance axially over the outside of the bearing casing 5. Thereby, the plastic material 8 is fixated on the bearing casing 5 after curing, thus keeping the wiper shaft 6 in its momentary position. The plastic material 8 at the same time serves as a bearing and as a seal against the penetration of dirt and/or against leakage of lubricant from the inside of the gear casing 3.

The wiper shaft 6 has to be aligned with respect to the bearing casing 5 only in so far as not to touch the inside of the bearing casing. Exact coaxial alignment is admittedly strived at, yet not necessary. Further, the cured plastic material 8 fixates the wiper shaft 6 in the axial direction so that no further components will be required for this purpose, either.

FIG. 2 represents a wiper bearing where, in bearing casing 5, the wiper shaft 6 is likewise fixated by means of the plastic material 8. At the end 14 opposite a knurled cone 13, a crank 15 with a pressed-on ball pin 16 is arranged for force transmission or rather for the transmission of the swinging motion. As is evident from FIG. 2, the plastic material 8 has been drawn axially and radially around the front sides 7 of the bearing casing 5. In this way, the cured plastic material 8 is axially fixated in the bearing casing 5. Further, the wiper shaft 6 has a cylindrical groove 17 corresponding to recess 11 and 12, respectively, of the wiper shaft 6 of FIG. 1. With this groove 17, the wiper shaft 6 is likewise fixated in the axial direction in the plastic material 8 and, hence, in the bearing casing 5 whereas there is no fixation in the circumferential direction. Further, it is discernible that the bearing casing 5 has a feed 18 through which the plastified plastic material 8 can be injected so that the same can extend within the cylindrical groove 17 radially and, along the annular gap 9, axially as far as the front sides 7. Tools applied to the front sides 7 will prevent the plastic material 8 from emerging from the annular gap 9 or rather divert the same in the axial and radial directions so that the front sides 7 will be injection-moulded around as shown in FIG. 2.

FIG. 4a represents a detail of the front side 7 where an annular axial groove 19 is provided. The plastic material 8 is injected into this axial groove 19. Through axial groove 19, the plastic material 8 is urged to the surface of wiper shaft 6. Thus, a particularly good sealing action will be achieved. FIG. 4b shows an example of an embodiment where an O-ring 20 is integrated in the section of the plastic material 8 which axially overlaps front side 7. This O-ring 20, on its part, rests on the surface of the wiper shaft 6. Together with O-ring 20, the section of the plastic material 8 which overlaps front side 7 is altogether overlapped by an annular protecting cap 21. By way of this annular protecting cap 21, both the plastic material 8 and the O-ring 20 are pressed onto the surface of the wiper shaft 6, thus an optimum sealing action being achieved.

In the embodiment represented in FIG. 4c, the plastic material 8 is designed so as to taper outwards. Because of the after-shrinkage of the plastic material 8, thus, another possibility is procured for achieving an optimum sealing, for instance, against penetration of water.

FIGS. 3a and 3b show two embodiments of a design of the inside of the bearing casing 5, both Figures representing the section III—III according to FIG. 2. In the example of an embodiment as per FIG. 3a, the inside of the bearing casing 5 is provided with dovetail-shaped grooves 22 whereas, in the example of an embodiment of FIG. 3b, the inside of the bearing casing 5 is equipped with grooves 24 provided with undercuts 23. Grooves 22 and 24, respectively, extend in particular over the entire length of the bearing casing 5 in the axial direction. Grooves 22 and 24 into which the plastified plastic material 8 is injected will fixate the plastic material 8 in the circumferential direction after curing of the plastic material 8 so that the plastic material 8 will be prevented from being carried along in the rotation when the wiper shaft 6 moves in the bearing casing 5. The ribs 25 separating the grooves 22 and 24, respectively, from one another do not serve as a bearing for the wiper shaft 6 but merely to anchor the plastic material 8 on the inside of the bearing casing 5.

In FIG. 2, the wiper shaft 6 is provided with a cylindrical groove 17, with this embodiment only being represented by way of example. FIG. 5 illustrates a spherical groove 26 representing another embodiment.

We claim:

1. A wiper comprising:

a drive mechanism with a linkage coupled to the drive mechanism, at least one of the drive mechanism and the linkage being provided with at least one rotating or swinging shaft supported in a casing, and with an annular gap provided between the shaft and said casing, wherein said annular gap between the shaft and its casing is at least sectionally filled by the injection of a plastic material or metal further wherein in cured or permanently hardened condition, the injected plastic material or metal, forms a bearing and a seal for the shaft.

2. A method of fixating a shaft in its bearing casing in wiper installations, said shaft of the type including an annular gap between the shaft and the bearing casing, comprising the steps of:

inserting and aligning of the shaft in its bearing casing, injecting at least one of a plastic material and metal into the annular gap, wherein at least two different plastic materials or metals, are injected into the annular gap simultaneously or in succession.

* * * * *